Aug. 23, 1927.

H. C. MALLORY 1,639,742

EXPANSIBLE COLLAPSIBLE ELEMENT

Filed July 25, 1925

Patented Aug. 23, 1927.

1,639,742

UNITED STATES PATENT OFFICE.

HARRY C. MALLORY, DECEASED, LATE OF BELLPORT, NEW YORK; BY SUE R. MALLORY, ADMINISTRATRIX, OF BELLPORT, NEW YORK; SAID HARRY C. MALLORY ASSIGNOR, BY MESNE ASSIGNMENTS, TO AMERICAN RADIATOR COMPANY, OF CHICAGO, ILLINOIS, A CORPORATION OF NEW JERSEY.

EXPANSIBLE COLLAPSIBLE ELEMENT.

Original application filed August 31, 1920, Serial No. 407,211. Divided and this application filed July 25, 1925. Serial No. 46,105.

The invention relates to elastic elements, and the same has for its object more particularly to provide an elastic metallic element for use in connection with apparatus or devices subject to or influenced by temperature or pressure variations, whereby to operate a valve, apparatus or other mechanism.

Further, said invention has for its object to provide an expansible-collapsible element of the character specified having means whereby said element may be readily and efficiently secured to or within a support or closure so as to form an hermetically sealed joint where said parts meet.

Further, said invention has for its object to provide an expansible-collapsible element of the character specified having means whereby said element may be readily and conveniently secured to or within a support or closure, and hermetically sealed thereto at a point beyond the point or zone where said element is mechanically secured to said support or closure.

Other objects will in part be obvious, and in part be pointed out hereinafter.

To the attainment of the aforesaid objects and ends the invention consists in the novel details of construction, and in the combination, connection and arrangement of parts hereinafter more fully described and then pointed out in the claims.

Figure 1:
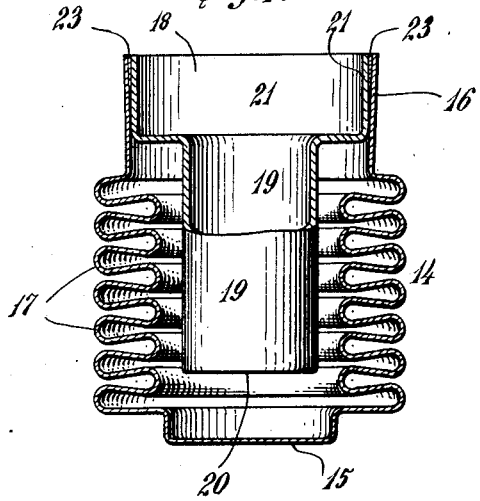
Figure 2:
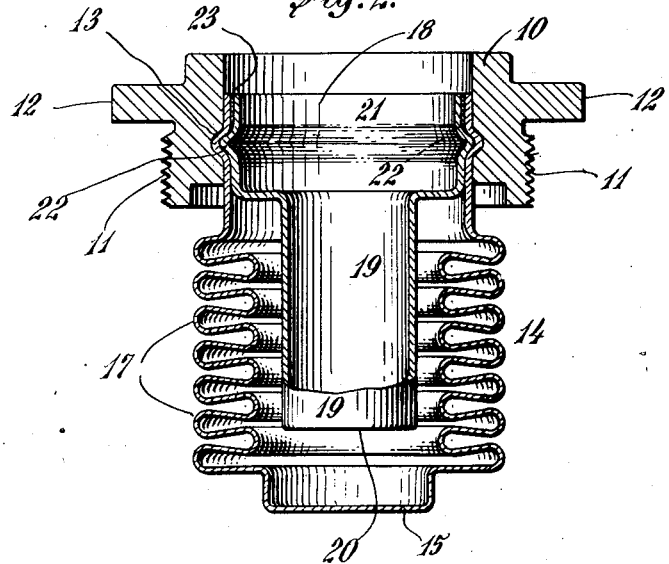

In the accompanying drawings forming part of this specification wherein like numerals of reference indicate like parts, Figure 1 is an enlarged central section showing one form of expansible-collapsible element and closure secured thereto constructed according to, and embodying the said invention, and Fig. 2 is a similar view showing the sealed or closed expansible-collapsible element mechanically secured to a support.

In said drawings 10 designates an annular support provided upon its outer side with screw-threads 11, and above said screw threads with a shoulder 12. Upon the inner side of said annular support 10 is provided a circular recess 13.

14 denotes an expansible-collapsible element formed from a cylindrical shell having a closed end 15, an open end 16, and an intermediate or body portion provided with a series of circumferential corrugations or folds 17. The open end portion 16 has its side wall smooth, and of greater thickness than the corrugated intermediate or body portion with which it is united by an annular wall portion which diminishes in thickness from the wall of said open end portion 16 towards the corrugated intermediate portion with which it merges.

18 denotes a closure for said expansible-collapsible element which comprises a cylindrical portion 19 of smaller diameter than the interior of said expansible-collapsible element within which the same is disposed. The inner end of the cylinderical portion 19 is provided with a closed end 20, and its outer end, which is of greater diameter than said cylindrical portion 19, forms a flange 21 which conforms closely to the inner surface of the wall portion of the open end portion 16 of the expansible-collapsible element.

The outer end of the wall portion of the open end 16 of the expansible-collapsible element, and the corresponding end of the flange 21 of the closure 18 are jointly pressed into engagement with the circular recess in the inner side of the support 10, and firmly secured thereto by a bead 22.

To render the joint between the outer tubular ends of the expansible-collapsible element 14 and the closure 18 fluid tight the parts are soldered or otherwise sealed by a suitable sealing medium 23 which may extend from the bead 22, which mechanically joins said parts, outwardly towards the outer edges of the element 14 and closure 18. For the purposes of illustration the thickness of the sealing medium 23 is shown exaggerated in the drawings. In actual practice the same is in the form of a thin layer or film.

It is to be noted that by sealing the parts at a point above or beyond the annular bead 22, the sealed parts may be readily and conveniently secured by pressure within said support 10 without danger or liability of injuring or rupturing the seal.

This application is a division of an application, Serial No. 407,211, filed by Harry C. Mallory August 31, 1920, the latter application being a continuation in part of an application, Serial No. 833,593, filed by him April 22, 1914, renewed December 5, 1919, Serial No. 342,802, and patented January 25, 1921, No. 1,366,473.

In this case, no claim is made for the process from which the product herein shown, described and claimed results, as said process constitutes the subject matter of said application, Serial No. 407,211.

Having thus described the said invention, what is claimed and desired to be secured by Letters Patent is:

1. A device of the character described comprising a support, an expansible-collapsible element having a closed end and an open end; said element having its open end secured to said support, and a closure for said open end and sealed thereto beyond the point of securement of said element to said support, substantially as specified.

2. A device of the character described comprising a support, an expansible-collapsible element having a closed end and an open end; said element having its open end secured to said support, and a closure for said open end and sealed to said expansible-collapsible element independently of the means for securing said element to said support, substantially as specified.

3. A device of the character described comprising a support having a recess therein, an expansible-collapsible element having a closed end and an open end, a closure for said open end having a portion thereof pressed jointly with a portion of the open end of said element into engagement with the recess in said support, and said element and said closure having their contiguous end portions soldered together beyond the portions thereof in engagement with the recess in said support, substantially as specified.

4. A device of the character described comprising a support, an expansible-collapsible element having a closed end and an open end, a closure for said open end; said closure and the end of said expansible-collapsible element closed thereby being mechanically secured to said support, and said closure sealed to said expansible-collapsible element beyond the point of securement thereof to said support, substantially as specified.

5. A device of the character described comprising a support, an expansible-collapsible element having a closed end portion and an open end portion, and a closure for said element and having a portion conforming closely to the open end portion of said element; the contiguous surfaces of said conforming portions being sealed to form a fluid tight joint between the same; and said sealed parts being attached to said support, substantially as specified.

6. A device of the character described comprising a support, an expansible-collapsible element having a closed end portion and an open end portion, and a closure for said open end portion and sealed to said element to form a fluid tight joint therewith; said parts at a portion thereof adjacent to said sealed joint being so attached to said support as to insure a permanently sealed joint between said element and said closure, substantially as specified.

7. A device of the character described comprising a support, an expansible-collapsible element having a closed end portion and an open end portion, and a closure for said element and having a portion conforming closely to the open end portion of said element; portions of the contiguous surfaces of said conforming portions being sealed to form a fluid tight joint between the same; and said parts at the conforming portions thereof and beyond said sealed joint being attached to said support, substantially as specified.

8. A device of the character described comprising a support, an expansible-collapsible element having a closed end portion and a tubular open end portion, and a closure for said element and having a tubular portion conforming closely to the tubular portion of said element; the contiguous surfaces of said tubular portions being sealed to form a fluid tight joint between the same; and said sealed parts at said tubular portions being so attached to said support as to insure a permanently sealed joint between said element and said closure, substantially as specified.

9. A device of the character described comprising a support having a recess therein, an expansible-collapsible element having a closed end portion and a tubular open end portion, and a closure for said element having a tubular portion conforming closely to the tubular portion of said element; said tubular portions, inwardly of the edges thereof being jointly pressed into engagement with the recess in said support for securing said element and said closure to said support; and said tubular portions beyond said recess engaging parts thereof and inwardly of the edges thereof being sealed to form a fluid tight joint between the same, substantially as specified.

10. A device of the character described comprising a support having a recess therein, an expansible-collapsible element having a closed end portion and a tubular open end portion, a closure for said element having a tubular end portion disposed within the tubular end portion of said element and conforming closely thereto, and a bead formed in said tubular portions inwardly of the edges thereof and engaging in said recess for securing said element and said closure to said support; the contiguous surfaces of said tubular portions beyond said bead and inwardly of the edges of said tubular portions being sealed to form a fluid tight joint between the same, substantially as specified.

11. A device of the character described comprising an expansible-collapsible element having a closed end portion and an open end portion, and a closure for the open end of said element and connected thereto; said element and said closure being sealed independently of said connection to form a fluid tight joint between said parts, substantially as specified.

12. A device of the character described comprising an expansible-collapsible element having a closed end portion and a tubular open end portion, and a closure for said element; said closure having a tubular portion conforming closely to the tubular portion of said element; and the contiguous surfaces of said tubular portions inwardly of the edges thereof being sealed to form a fluid tight joint between the same, substantially as specified.

13. A device of the character described comprising an expansible-collapsible element having a closed end portion and a tubular open end portion, a closure for said element having a tubular portion conforming closely to the tubular portion of said element, and attaching means formed on said tubular portions; said tubular portions beyond said attaching means being sealed to form a fluid tight joint between said parts, substantially as specified.

14. A device of the character described comprising an expansible-collapsible element having a closed end portion and a tubular open end portion, a closure for said element having a tubular portion conforming closely to the tubular portion of said element, and a bead formed in said tubular portions; the contiguous surfaces of said tubular portions beyond said bead being sealed to form a fluid tight joint between said tubular portions, substantially as specified.

Signed at the city of New York, in the county and State of New York, this 22nd day of July, one thousand nine hundred and twenty-five.

SUE R. MALLORY,
*Administratrix of the Estate of Harry Mallory, Deceased.*